(12) United States Patent
Lemoine et al.

(10) Patent No.: US 9,079,490 B2
(45) Date of Patent: Jul. 14, 2015

(54) METHOD FOR FASTENING AN ACCESSORY TO A PLASTIC FUEL TANK

(75) Inventors: Hervé Lemoine, Tracy le Mont (FR); Frédéric Jannot, Bousval (BE)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 1281 days.

(21) Appl. No.: 12/668,186

(22) PCT Filed: Jul. 10, 2008

(86) PCT No.: PCT/EP2008/059042
§ 371 (c)(1),
(2), (4) Date: May 4, 2010

(87) PCT Pub. No.: WO2009/007433
PCT Pub. Date: Jan. 15, 2009

(65) Prior Publication Data
US 2010/0212806 A1     Aug. 26, 2010

(30) Foreign Application Priority Data
Jul. 11, 2007   (FR) .................................... 07 56411

(51) Int. Cl.
*B21D 39/00*     (2006.01)
*B60K 15/077*    (2006.01)
(Continued)

(52) U.S. Cl.
CPC ............. *B60K 15/077* (2013.01); *B29C 65/609* (2013.01); *B29C 66/532* (2013.01);
(Continued)

(58) Field of Classification Search
CPC .......... B21J 15/02; B21J 15/10; B21J 15/142; B29C 65/609; B29C 66/532; B29C 66/9672; B60K 15/03177; B60K 15/077; B29K 2105/0032; B29K 2105/0041; B29K 2105/0085; B29K 2105/06; B29K 2105/25; Y10T 29/49; Y10T 29/49826; Y10T 29/49908; Y10T 29/4994; Y10T 29/49943
USPC .................... 29/592, 428, 505, 522.1, 524.1; 411/501; 156/91, 92
See application file for complete search history.

(56) References Cited

U.S. PATENT DOCUMENTS

| 4,106,962 A | 8/1978 | Adams et al. |
| 4,253,226 A | 3/1981 | Takeda |

(Continued)

FOREIGN PATENT DOCUMENTS

| CA | 2 641 463 A1 | 8/2007 |
| EP | 1110697 A2 | 6/2001 |

(Continued)

OTHER PUBLICATIONS

U.S. Appl. No. 11/658,085, filed Oct. 4, 2007, Bjorn Criel et al.

*Primary Examiner* — Peter DungBa Vo
*Assistant Examiner* — Azm Parvez
(74) *Attorney, Agent, or Firm* — Oblon, McClelland, Maier & Neustadt, L.L.P.

(57) ABSTRACT

Method for fastening an accessory to a wall of a plastic fuel tank, this fastening taking place by snap-riveting using a tool at the same time as the tank is manufactured by molding, the accessory being, for this purpose, provided at at least one of its fastening points with an orifice through which the snap-riveting is carried out. According to the invention, a concave relief at least partially surrounds this orifice, the relief having a size and shape suitable for being able to cooperate with an excrescence of the tool during the snap-riveting.

14 Claims, 3 Drawing Sheets

(51) Int. Cl.
B29C 65/00 (2006.01)
B60K 15/03 (2006.01)
*B29C 49/00* (2006.01)
*B29C 49/04* (2006.01)
*B29C 49/20* (2006.01)
*B29C 65/60* (2006.01)
*B29K 23/00* (2006.01)
*B29K 59/00* (2006.01)
*B29K 67/00* (2006.01)
*B29K 77/00* (2006.01)
*B29K 101/12* (2006.01)
*B29K 105/00* (2006.01)
*B29K 105/06* (2006.01)
*B29K 223/00* (2006.01)
*B29L 9/00* (2006.01)
*B29L 31/00* (2006.01)

(52) U.S. Cl.
CPC ....... B60K15/03177 (2013.01); *B29C 49/0047* (2013.01); *B29C 49/04* (2013.01); *B29C 49/20* (2013.01); *B29C 65/606* (2013.01); *B29C 66/9672* (2013.01); *B29C 2049/2008* (2013.01); *B29C 2793/0081* (2013.01); *B29K 2023/00* (2013.01); *B29K 2023/06* (2013.01); *B29K 2023/065* (2013.01); *B29K 2023/086* (2013.01); *B29K 2059/00* (2013.01); *B29K 2067/006* (2013.01); *B29K 2077/00* (2013.01); *B29K 2101/12* (2013.01); *B29K 2105/0032* (2013.01); *B29K 2105/0041* (2013.01); *B29K 2105/0085* (2013.01); *B29K 2105/06* (2013.01); *B29K 2105/25* (2013.01); *B29K 2223/00* (2013.01); *B29K 2995/0067* (2013.01); *B29K 2995/0069* (2013.01); *B29L 2009/00* (2013.01); *B29L 2031/7172* (2013.01); *B60K 2015/03467* (2013.01); *Y10T 29/49* (2015.01)

(56) References Cited

U.S. PATENT DOCUMENTS

| | | | |
|---|---|---|---|
| 5,308,427 A * | 5/1994 | Duhaime et al. | 156/245 |
| 5,352,259 A * | 10/1994 | Oku et al. | 65/412 |
| 2001/0015513 A1 | 8/2001 | Schaftingen et al. | |
| 2006/0022381 A1 * | 2/2006 | Brozenick et al. | 264/273 |
| 2008/0006625 A1 * | 1/2008 | Borchert et al. | 220/4.13 |
| 2008/0164639 A1 * | 7/2008 | Criel et al. | 264/511 |

FOREIGN PATENT DOCUMENTS

| | | |
|---|---|---|
| GB | 1410215 A | 10/1975 |
| WO | WO 2006008308 A1 * | 1/2006 |
| WO | WO 20060008308 A1 | 1/2006 |
| WO | WO 2007/090453 A2 | 8/2007 |
| WO | WO 2007093573 A1 | 8/2007 |

* cited by examiner

METHOD FOR FASTENING AN ACCESSORY TO A PLASTIC FUEL TANK

CROSS-REFERENCE TO RELATED APPLICATIONS

This application is a U.S. national stage application under 35 U.S.C. §371 of International Application No. PCT/EP2008/059042 filed Jul. 10, 2008, which claims priority to French Patent Application No. 0756411 filed Jul. 11, 2007, these applications being incorporated herein by reference in their entirety for all purposes.

BACKGROUND OF THE INVENTION

The present invention relates to a method for fastening an accessory to a wall of a plastic fuel tank.

Fuel tanks on board vehicles of various kinds must generally meet sealing and permeability standards in relation to the type of usage for which they are designed and the environmental requirements with which they must comply. Both in Europe and throughout the world we are currently experiencing a considerable tightening of the requirements concerned with limiting the emissions of pollutants into the atmosphere and into the environment in general.

To limit these emissions, care is taken in particular to position the accessories (ventilation lines, valves, baffles, stiffeners, etc.) inside the tank and, to limit the number of openings through its wall, the Applicant has developed a method of initially moulding a parison that includes at least one slot for introducing thereinto (and fixing thereto) accessories during the actual moulding of the tank and thus avoiding drilling openings (see, in particular, Application EP 1 110 697).

The Applicant has also developed a particular method for this fastening (in situ snap-riveting, the subject of Application WO 2006/008308, the content of which is incorporated for this purpose for reference into the present application) and also an improvement of this method taking into account the fact that as the tank cools down after moulding it undergoes considerable shrinkage (typically of around 3%). This improved method is the subject of international Application EP 2007/051326 in the name of the Applicant, the content of which is also incorporated for reference into the present application.

One accessory which has been described in FIG. 1 of this application is a support for a valve which comprises two flexible tabs, moulded as one piece with it, and each provided with an orifice that enables the snap-riveting. The Applicant has, however, observed that with the tab geometry illustrated in this figure (simple curved tongues equipped with an orifice in the fastening zone), it was difficult to load this accessory onto the core (the tongues having a tendency to slide outside the enclaves provided for them on the core) and that, in addition, the mechanical stress exerted at the fastening was not uniformly distributed.

BRIEF SUMMARY OF THE INVENTION

The object of the invention is hence to provide an improved geometry of the snap-riveting zone that makes it possible to ensure self-centring of the accessory with respect to the tool which will carry out the snap-riveting and that makes it possible to obtain a better distribution of the stress during this process.

For this purpose, the invention relates to a method for fastening an accessory to a wall of a plastic fuel tank, this fastening taking place by snap-riveting using a tool at the same time as said tank is manufactured by moulding, the accessory being, for this purpose, provided at at least one of its fastening points with an orifice through which the snap-riveting is carried out. According to the invention, a concave relief at least partially surrounds this orifice, said relief having a size and shape suitable for being able to cooperate with an excrescence (convex relief) of the tool during the snap-riveting, this excrescence in fact pressing into the concave relief in order to carry out the snap-riveting.

The present invention is illustrated, without any limitation being implied, in FIGS. 1 to 3.

FIG. 1 illustrates an accessory suitable for one advantageous variant of the present invention.

FIG. 2 consists of an enlargement of one part of this accessory in one of its fastening zones.

FIG. 3 schematically illustrates the complementary geometry of a fastening tab and of the corresponding snap-riveting tool (in an empty mould on the left, and with a portion of parison/tank wall on the right, to better illustrate the snap-riveting principle).

DETAILED DESCRIPTION OF THE INVENTION

The term "fuel tank" is understood to mean a sealed tank (or hollow body bounded by a wall) capable of storing fuel under diverse and varied usage and environmental conditions. An example of this tank is that with which motor vehicles are fitted.

The fuel tank according to the invention is made of a plastic.

The term "plastic" means any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but non-limitingly: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between the HDPE-based outer layers.

Within the context of the invention, the term "accessory" is understood to mean:
  any functional object or device which is generally associated with the fuel tank in its usual mode of use or operation and which cooperates with the latter in order to fulfil certain useful functions; or
  a support for one or more such devices.

Non-limiting examples of such devices are: liquid pumps, level gauges, delivery tubes, reservoirs or baffles internal to the fuel tank, ventilation devices (valves, pipes, etc.), electronic units and stiffening bars.

According to one advantageous way of implementing the method according to the invention, the accessory is in fact a preassembled structure comprising a support and one or more identical or different devices that are fastened thereto via any suitable fastening means. Examples of these means are clip-fastening, screw-fastening, welding, etc. It is also advantageous for the preassembled structure to bear means allowing additional devices to be joined that would be possibly fastened subsequently. These means are also clip-fastening devices, capped holes or threaded protuberances of circular shape for screwing, surface regions that can be welded, etc. Within the same concept, the accessory may consist of a simple support that includes suitable means for subsequently fastening one or more devices. In other words, the accessory preferably includes a support that is either provided with fastening means, for one or more functional devices of the fuel tank (and which may be the cover of the accessory), or bears one or more such devices directly.

According to the invention, at least one of the fastening points of the accessory is provided with an orifice that enables snap-riveting (common technique in the field of metallurgy that consists in moulding a rivet in situ, from molten material that has been made to overflow through an orifice in the part to be fastened and then left therein to solidify, preferably after having somewhat flattened the part that has overflowed to give it the shape of a rivet).

Preferably, the snap-riveting orifice is made in a fastening tab moulded as one part with the accessory or attached thereto. It may be a simple part of the accessory (being part of its overall envelope) equipped with at least one orifice or an excrescence on its overall envelope provided with an orifice.

This fastening tab can have any shape: tongue provided with one or more orifices; flange surrounding the accessory and comprising several orifices, etc.

Preferably, the accessory is equipped with several fastening tabs, if possible distributed evenly over the latter. Most particularly preferably, each fastening tab comprises several orifices so as to distribute the load during a mechanical stress (for example, simply exerted by gravity) on the accessory.

According to the invention, the snap-riveting orifice or orifices is/are surrounded by a concave relief. The term "concave" is in fact understood to mean a hollow shape without a cover, the base of which is formed by the part of the accessory surrounding the orifice or orifices and which is pointing towards the inside of the tank. This relief may consist of a substantially cylindrical wall that is substantially perpendicular to the wall of the tank. It may have a continuous or discontinuous side wall. It is preferably discontinuous, or in any case: provided with openings that confer a certain mobility (deformability) on this relief and/or allow a visual inspection of the snap rivets (for example, with the aid of a camera: see further on).

This relief may comprise a tongue or excrescence, the purpose of which is to ensure the clamping of the component (i.e. its fastening to the core, for example using a small piston which props up the tongue). The fact of maintaining (clamping) the component very close to its fastening tab makes it possible to ensure that this tab is completely taken charge of by the tool and therefore positioned in a good location relative to this. If the clamping is carried out too far from the fastening tab, the tab of the component cannot be attached to a good location following deformation of the material between the tab and the clamping point.

In the case where the orifice is located at one end of a fastening tab (or of any other part of the accessory), the concave relief may be produced in a simple extension of the wall of this tab/part.

Within the context of the invention, although the accessory is fastened to the wall of the tank, it is preferred that it can move relative to its fastening point on the wall of the tank. Moreover, preferably all the points where the accessory is fastened to the wall of the tank are provided with a fastening part so that the accessory can move relative to all the corresponding fastening points on the wall of the tank.

This mobility may be obtained in various ways. In the case where the accessory comprises at least one fastening tab, it is sufficient to ensure that this is in the form of a flexible tongue, i.e. a part that is flat (but which may be curved, folded, etc.) having a thickness, a shape and/or a constituent material that give the accessory a relative mobility with respect to the wall of the tank when it is fastened thereto. Preferably, each of the points where the accessory is fastened to the tank is provided with such a flexible tongue.

The fastening tabs according to this variant of the invention are preferably based on a heat-resistant material in order to prevent an exaggerated deformation of the latter. Materials such as POM (polyoxymethylene), PA (polyamide), PBT (polybutylene terephthalate) and metals are particularly suitable. HPPE is less recommended as it can deform at the usage temperature, at least for the thicknesses generally considered (2 to 3 mm).

Most particularly preferably, each fastening tab is provided with a circular orifice, preferably located substantially at the centre of its zone for fastening to the tank (i.e. the zone in contact with the parison during the snap-riveting) and this circular orifice is preferably surrounded by several slots (2, 3, 4 or more) that are preferably distributed evenly over a circumference surrounding the central orifice, the purpose of which is to increase the load-bearing strength of the fastening (the component acting via its weight on the still molten plastic in the snap-riveting zone). Generally, the fastening zone of the tab is located at a curved (folded) end of this tab.

According to the invention, the accessory is fastened to the wall of the tank while it is being moulded and the mobility of the accessory relative to the fastening part is preferably sufficient to be able to compensate for the post-moulding shrinkage which, in the case of HDPE tanks, is about 3%.

The moulding of fuel tanks generally starts with a parison. The term "parison" is understood to mean a preform, generally extruded, which is intended to form the wall of the tank after being moulded to the required shape and dimensions. In general, plastic fuel tanks are moulded by thermoforming flat sheets or by blow-moulding an extruded tubular parison, which does not necessarily have to be made in one piece.

The tank is preferably moulded by blow-moulding a parison made up of two separate parts, which may for example be two sheets. However, these parts preferably result from cutting one and the same extruded tubular parison as described in Application EP 1 110 697 mentioned above, the content of which for this purpose is incorporated for reference into the present application.

According to this variant, once a single parison has been extruded, this parison is cut along its entire length, along two diametrically opposed lines, to obtain two separate parts (sheets).

By comparison with the moulding of two separately extruded sheets, the thickness of which is constant, this approach makes it possible to use parisons of varying thickness (that is to say in which the thickness is not constant along their length), obtained using a suitable extruding device (generally an extruder equipped with a die and a punch, the position of which is adjustable). Such a parison takes account of the reduction in thickness that occurs during moulding at certain points on the parison, as a result of non-constant rates of deformation of the material in the mould.

No matter which technique for moulding the parison, it does involve by definition the use of a mould comprising in general two cavities that are intended to be in contact with the external surface of the parison, the thermoforming or blow-moulding of the parison taking place by the parison being pressed against these cavities by applying a vacuum from behind the cavities or by using a pressurized gas injected into the parison.

According to one advantageous variant of the invention, the mould also comprises a core which incorporates at least one part of the fastening (snap-riveting) tool. The term "core" is understood to mean a part of suitable shape and size for being able to be inserted between the mould cavities and, in particular, to be introduced into the parison while it is being moulded. A part such as this is, for example, described in Patent GB 1 410 215, the content of which is for this purpose incorporated for reference into the present application. Advantageously, this core may be used for fastening several accessories to the parison at the same time, something which the alternative devices, such as for example robot arms, cannot in general accomplish. In this variant, the accessory is fastened to the inner wall of the tank and the concave relief is pointing towards the inside of this tank.

The core may also be used to introduce the pressurized gas needed for blow-moulding the parison. Moreover, when the parison to be blown consists of two parts, the core may also be used to keep the edges of these two parts hot, at least during certain steps of the process (in general: the steps preceding the welding-together of the two parts to produce the tank). Two-part parisons are very suitable for this variant as they can be separated upon opening the mould and thus make it easier to fasten the fill tube.

Finally, the core may also be used at least partially for process control. For this purpose, it is possible for example to incorporate a camera into the core so as to display and check the quality of the fastening of the accessory as explained previously. This camera may also check the quality of the fastening (connection) of the fill tube (and of all the other possible components of the tank). Generally, these checks take place by image analysis. One or more sensors for measuring one or more quantities, such as force, stroke, pressure, temperature, may also be installed on the core so as to better monitor the fastening of the accessories.

According to the invention, the accessory is fastened to the wall of the tank by snap-riveting using a suitable tool that is preferably at least partly integrated into a core as described previously. This tool has, for this purpose, an excrescence (convex relief) firmly attached to the core and capable of cooperating with the concave relief present on (the fastening tab of) the accessory. This tool is generally actuated by a regulated actuator (i.e. an hydraulic ram generally regulated in force, stroke and/or pressure) and it generally comprises a counterform or hollow shape intended for moulding the upper part of the rivet (snap rivet). When there are several snap-riveting orifices, and therefore several concave reliefs, the corresponding excrescences may be part of a single snap-riveting tool or of several separate tools. Preferably, it is a single tool or several tools actuated by a single actuator.

It should be noted that in order to carry out the snap-riveting it is possible to merely use the aforementioned excrescence of the core (with its counterform) to mould the snap rivet. Alternatively, and according to a preferred variant described in detail in Application WO 2006/008308 mentioned above, the mould comprises a corresponding shape—a sort of hump—the role of which is to help to force the molten plastic through the snap-riveting orifice.

In the variant of the invention according to which the snap-riveting tool is at least partly borne by a core, the presence of an excrescence on this, which cooperates with the concave relief of the accessory to be fastened, makes it possible to facilitate the loading of the core and to self-centre the stresses applied during the snap-riveting.

Specifically, it is sufficient to position the accessory with its concave relief or reliefs fixed to the excrescence or excrescences of the snap-riveting tool or tools, in order to ensure correct positioning and centring of the accessory on the core before sealing over it the cavities between which the parison is found (in order to be able to fasten said accessory to the inner wall of this parison, at a good location).

Hence, one particularly advantageous method within the context of the invention comprises the following steps:
positioning the accessory on the core as explained above;
first closure of the mould (cavities brought together around the core with the parison inserted between);
pressing the parison firmly against the mould cavities (by blowing through the core and/or appling a vacuum behind the cavities);
fastening the accessory to the parison by snap-riveting;
opening the mould, removing the core, reclosing the mould and final moulding of the tank.

Finally, it is important to note that although the present invention has been developed within the context of fastening internal accessories to the tank, it could also be applied to fastening external accessories to the tank, which accessories would have, for this purpose, been positioned beforehand in the mould cavities. In this variant the mould cavities would be equipped with the snap-riveting tool comprising an excrescence capable of cooperating with the concave relief (this time pointing towards the outside of the tank). This gives good results with clips for example, which in turn will make it possible to fasten (by clipping) accessories to the outer surface of the tank after cooling of the latter.

BRIEF DESCRIPTION OF THE SEVERAL VIEWS OF THE DRAWINGS

The accessory (1) illustrated in FIGS. 1 and 2 in fact consists of a multi-accessory support equipped with fastening tabs (2) that are flexible and have various anchoring reliefs for the accessories that it is intended to receive.

Figure 1:
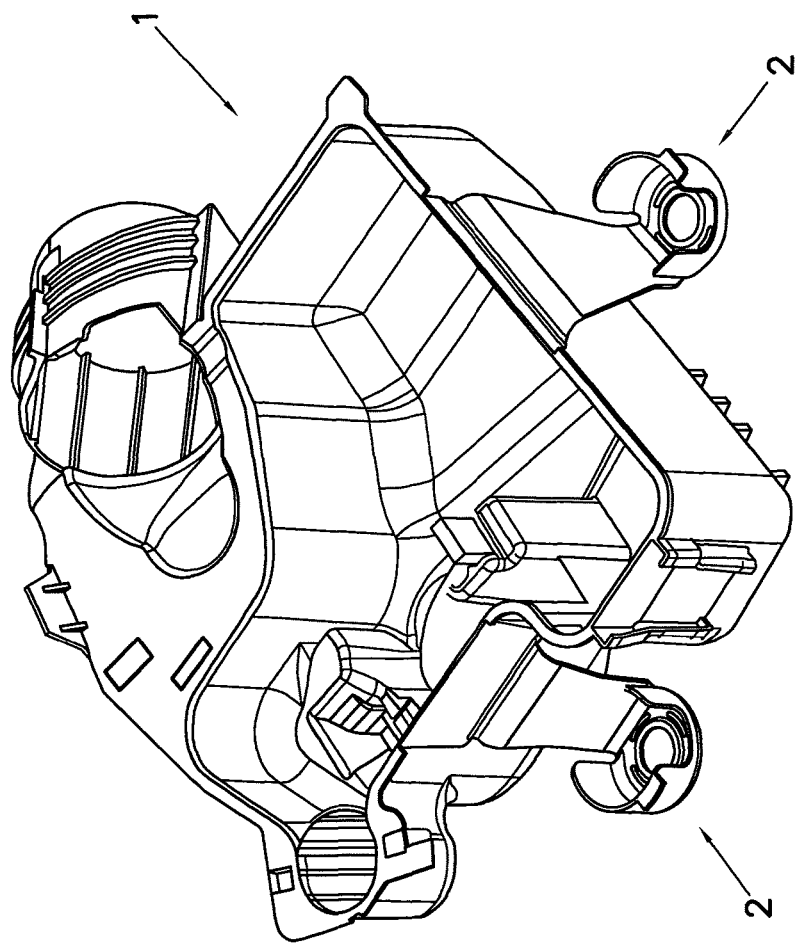
Figure 2:
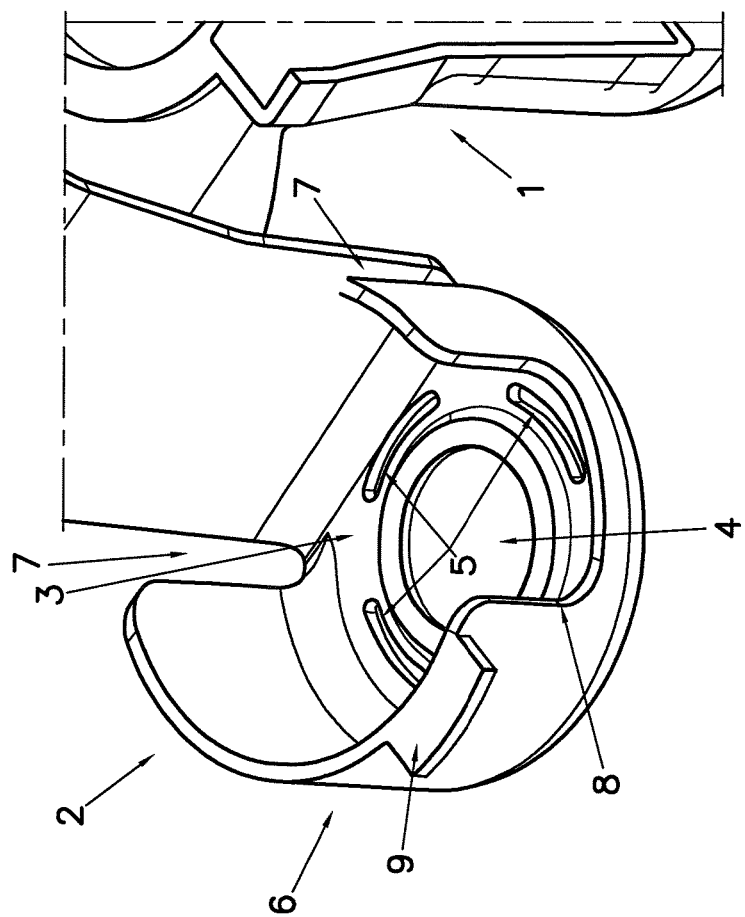
In FIG. 2, the geometry of the fastening tabs (2) of the accessory (1) appears more clearly: the curved end (3) of these tabs is provided with a central orifice (4) and with several slots (5) positioned over a circumference surrounding this orifice (4). This curved end (3) is extended by a cylindrical wall (6) in the shape of a cup provided with two recesses (7) that confer a certain mobility to the end of the tab—necessary for accompanying the shrinkage of the material during cooling of the tank—and a wider window (8) that allows visual inspection of the snap-rivet once the accessory is fastened to the wall of a tank. This wall (6) also comprises a tongue (9) for clamping the component to the snap-riveting tool.
Figure 3:
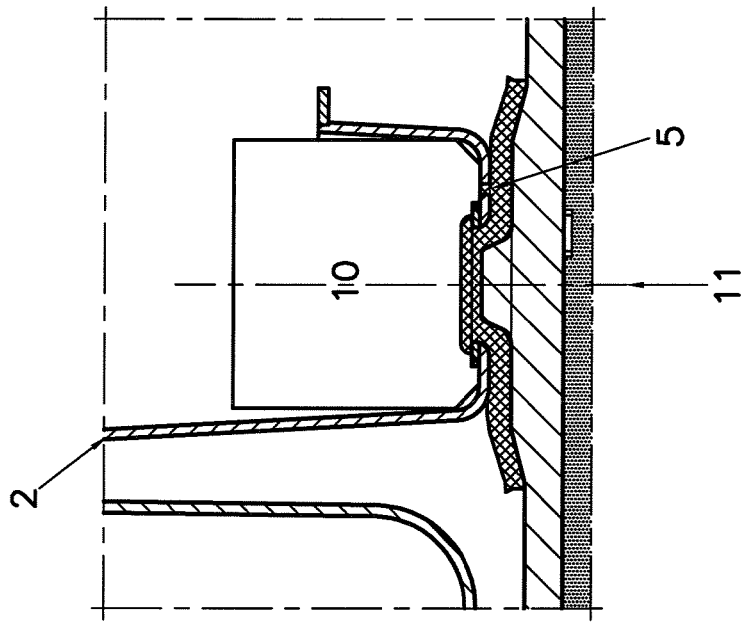
In FIG. 3, it can be seen how a snap-riveting tool (10)—only one part of which is schematically illustrated—firmly attached to a core (which is not represented) and which comprises a counterform (10'), cooperates with a form (excrescence) (11') in the mould (11) to mould the snap-rivet. In order to do this, the tool (10) is placed with its counterform (10') to the right of the orifice (4) in the fastening tab (2) then it presses into the bottom of the cup so as to force molten plastic through the orifice (4) and the slots (5). The overflowing of the material is assisted by the form (hump) (11') and the counterform (10') gives the material which has overflowed the shape of a rivet.
Figure 3:
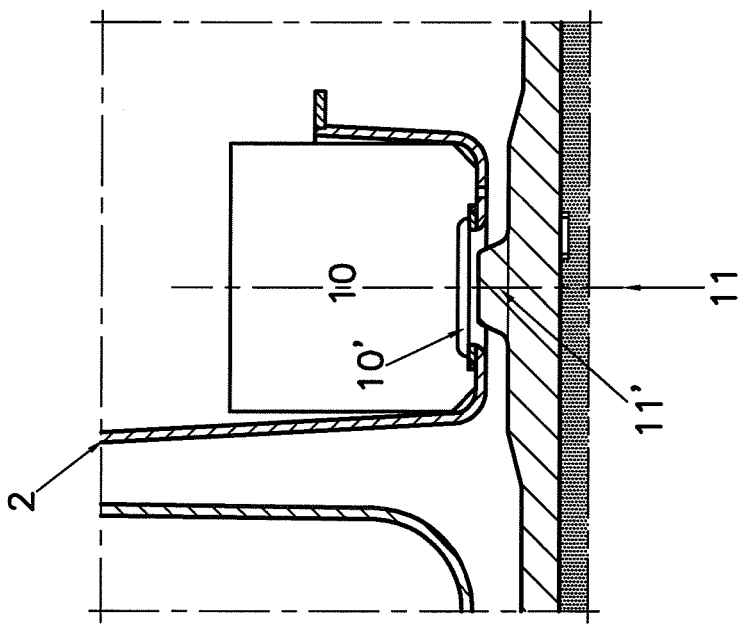

The invention claimed is:

1. A method for fastening an accessory to a wall of a plastic fuel tank, comprising:
    fastening by snap-riveting using a tool, at the same time as said tank is manufactured by moulding with a mould, the accessory including at least one orifice through which the snap-riveting is carried out by material of the tank protruding from the orifice and being deformed to mould the rivet,
    wherein the snap-riveting orifice is at least partially surrounded by a concave relief that protrudes towards an inside of the tank into which a convex relief of the tool presses in order to force the material through the orifice, the convex relief of the tool comprising a counterform to mould an upper part of the rivet.

2. The method according to claim 1, wherein the snap-riveting orifice is made in a fastening tab moulded as one part with the accessory or attached thereto.

3. The method according to claim 2, wherein the accessory is equipped with several evenly distributed fastening tabs, each fastening tab comprising the at least one snap-riveting orifice.

4. The method according to claim 1, wherein the concave relief consists of a substantially cylindrical wall that is substantially perpendicular to the wall of the tank, the substantially cylindrical wall of the concave relief being equipped with openings.

5. The method according to claim 2, wherein the fastening tab is a flexible tongue that has a thickness, a shape or a constituent material that give the accessory a relative mobility with respect to a fastening point or points on the tank.

6. The method according to claim 5, wherein the fastening tab has a curved end provided with a circular orifice surrounded by several slots that are evenly distributed over a circumference surrounding this orifice.

7. The method according to claim 1, wherein the tank is blow-moulded from a parison that is made up of two separate parts obtained by extruding a single parison that is cut over an entire length along two diametrically opposed lines.

8. The method according to claim 1, wherein the moulding is carried out using a mould comprising two cavities and a core which at least partly incorporates the snap-riveting tool, and wherein the accessory is fastened to an inner wall of the tank.

9. The method according to claim 8, wherein the core is equipped with a camera allowing visual control of the snap-riveting quality.

10. The method according to claim 1, wherein the snap-riveting tool is actuated by a regulated actuator.

11. The method according to claim 1, wherein the mould includes a form that together with the tool forces the material to protrude from the orifice when pressed by the tool.

12. A method for fastening an accessory to a wall of a plastic fuel tank, comprising:
    fastening by snap-riveting using a tool, at the same time as said tank is manufactured by moulding with a mould, the accessory including at least one orifice through which the snap-riveting is carried out by material of the tank protruding from the orifice and being deformed to mould the rivet,
    wherein the snap-riveting orifice extends through a base portion of a concave relief formed in the accessory,
    wherein the concave relief is formed by the base portion and a wall portion that protrudes away from the base portion towards an inside of the tank,
    wherein an area of the base portion surrounds the orifice and faces towards the inside of the tank,
    wherein the wall portion at least partially surrounds the area of the base portion that surrounds the orifice such that the wall portion is spaced apart from the orifice by the area of the base portion that surrounds the orifice, and
    wherein a convex relief of the tool presses into the concave relief in order to force the material through the orifice, the convex relief of the tool comprising a counterform to mould an upper part of the rivet, which upper part contacts the area of the base portion that surrounds the orifice.

13. The method according to claim 1, wherein the concave relief is sized and shaped to cooperate with the convex relief of the tool and to ensure correct positioning and self-centering of the convex relief of the tool.

14. The method according to claim 1, wherein the concave relief includes a substantially cylindrical wall that is substantially perpendicular to the wall of the tank.

* * * * *